Figure 1:
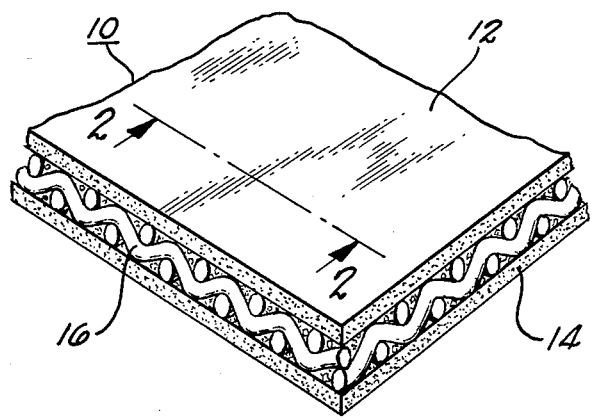

July 12, 1966     K. SCHWARTZWALDER     3,260,370
DRYCLEANING FILTER ELEMENT
Filed Sept. 5, 1963

INVENTOR.
KARL SCHWARTZWALDER
BY
Frederick M. Ritchie
HIS ATTORNEY

__HEADER__

3,260,370
DRYCLEANING FILTER ELEMENT

Karl Schwartzwalder, Holly, Mich., assignor to General Motors Corporation, Detroit, Mich., a corporation of Delaware
Filed Sept. 5, 1963, Ser. No. 306,812
7 Claims. (Cl. 210—489)

This invention relates to drycleaning apparatus and more particularly to an improved composite filter element for use in filtering and conditioning drycleaning solvent.

In drycleaning apparatus of the replaceable filter cartridge type, one or more cartridges are placed in the drycleaning system in a manner to intercept the flow of drycleaning solvent. The purpose of the filter cartridge is to remove particulate matter from the solvent and to condition the solvent by adsorbing dyes or the like. For this purpose porous paper is sometimes used for filtering particulate matter and activated charcoal or carbon is used for adsorbing dyes or the like from the solvent; and the manner in which these elements are combined is of major concern in holding down the cost of operation while maintaining the efficiency of a replaceable filter cartridge type drycleaner.

Accordingly it is an object of this invention to provide an improved composite filter element for used with drycleaning apparatus.

It is another object of this invention to provide a filter element formed as a sheet-like filter paper sandwich having a loosely woven cloth of paper strands in the center thereof for retaining solvent conditioning agents in the voids of the cloth weave between the outer porous paper layers of the sandwich.

Further objects and advantages of the present invention will be apparent from the following description, reference being had to the accompanying drawings wherein a preferred embodiment of the present invention is clearly shown.

Figure 2:
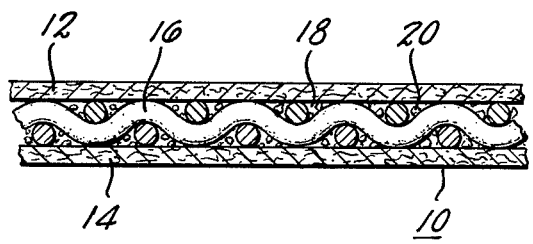

In the drawings:

FIGURE 1 is a fragmentary perspective view of a filter element sandwich formed in accordance with the teachings of the invention; and FIGURE 2 is a sectional view taken along line 2—2 in FIGURE 1.

In accordance with this invention and with reference to FIGURE 1, a three stage filter element 10 is illustrated. The filter element has a sheet-like appearance and is adapted to be folded into an accordion pleated tube for use in a drycleaning filter cartridge such as is taught in the copending application to McMichael Serial No. 210,651, filed July 18, 1962, now Patent No. 3,189,179 and assigned to the same assignee as this invention.

The three stage filter or solvent treating element 10 is comprised of a first filter paper layer or stage 12, a second filter paper layer or stage 14 spaced from the filter layer 12 and a loosely woven cloth or third stage 16 interposed between the paper layers. The cloth 16 is formed of paper fibers or strands loosely woven in a manner to form relatively large voids 18 in the weave between the reticulations or woven fibers of the cloth. The voids 18 are filled with a solvent conditioning agent 20, such as activated charcoal, although any other solvent conditioning agent such as powdered or granular detergents or anti-stats may be retained in the same manner. Thus the open weave cloth 16 forms, by the voids therein, a retainer for the granular or powdered solvent conditioning agent.

The paper sheets 12 and 14 may be of conventional filter paper design wherein the porosity thereof is controlled in a manner to filter out whatever size of particulate matter is found objectionable in drycleaning solvent.

The solvent treating element 10 is completed by sandwiching the three stages thereof together. The cloth 16 may be positioned on the bottom filter paper layer 14 while the granular solvent conditioning agent is spread over the cloth—the granules flowing into the voids between the spread apart strands of the cloth. Finally the upper filter paper layer 12 is placed over the cloth and granular material to complete the composite sandwich. Any suitable adhesive may be used to keep the sandwich together which will not prevent solvent flow therethrough.

The composite solvent treating element 10 may be used flat or it may be pleated and rolled into tubular form and used in the canister type filter cartridge of the aforementioned copending application. When used in such a filter cartridge, the retained solvent conditioning agent in the paper sandwich may be detergent. In this arrangement the filter element 12 becomes a self-contained unit wherein the outer layers 10 and 14 of filter paper serve to remove the particulate matter from the solvent to be clarified while the detergent held between the paper layers and the reticulations of the woven cloth is dissolved by the solvent and dispensed from the sandwich into the solvent for use in the drycleaning operation.

It should now be seen that an improved sheet-like filter element has been provided wherein a sandwich is formed of spaced filter paper sheets and open weave paper cloth—the voids in the cloth serving to retain any number of materials that may be used for chemically conditioning liquid flowing through the filter element. An advantage of such an element is in the protection afforded the granular material by the surrounding filter paper. If the material is carbon, a cleaner element is possible, in so far as handling the element is concerned, and there is no loss of carbon when the element is processed as by folding. It is, of course, within the purview of this invention to join the two sheets of filter paper along the peripheral edges only thereof to envelop or seal in any loose granular material which may be present in the peripheral zone of the sandwich.

While the embodiment of the present invention as herein disclosed, constitutes a preferred form, it is to be understood that other forms might be adopted.

What is claimed is as follows:

1. A three stage composite element adapted to sequentially filter, condition and filter solvent passing therethrough comprising a first stage portion including a first filter paper sheet having a porosity sufficient for filtering a first quantity of particulate matter from solvent passing therethrough, a second stage portion including a second filter paper sheet spaced from said first filter paper sheet and coextensive therewith and having a porosity sufficient for filtering a second quantity of particulate matter from solvent passing therethrough, a plurality of paper strands loosely woven to form an open weave cloth adhesively sandwiched between said first and second filter paper sheets and coextensive therewith, the reticulations of said cloth forming voids interposed between the strands thereof and between said first and second filter paper sheets, and a third stage portion including a finely divided conditioning agent retained in said voids by the woven strands of said cloth for conditioning solvent passing therethrough.

2. The composite element of claim 1 wherein said conditioning agent is carbon.

3. The composite element of claim 1 wherein said conditioning agent is detergent.

4. A three stage composite element adapted to filter, condition and filter fluid passing therethrough comprising a first stage portion including a first filter means having a porosity sufficient for filtering a first quantity of particulate matter from fluid passing therethrough, a second stage portion including a second filter means spaced from said first filter means and substantially coextensive therewith and having a porosity sufficient for filtering a second quantity of particulate matter from fluid passing therethrough, a plurality of strands loosely woven to form an open weave cloth between said first and second filter means and permanently sandwiched therewith, the reticulations of said cloth forming voids interposed between the strands thereof and between said first and second filter means, and a third stage portion including granular conditioning means in granular form retained in said voids by the woven strands of said cloth for conditioning fluid passing therethrough.

5. The composite element of claim 4 wherein said first and second filter means is cellulosic, and said granular conditioning means is carbon.

6. A three stage composite element adapted to sequentially filter, condition and filter fluid passing therethrough comprising a first stage portion including a first section of filter paper having a porosity sufficient for filtering a first particulate matter from fluid passing therethrough, a second stage portion including a second section of filter paper spaced at least in one area thereof from said first section of filter paper and coextensive therewith and having a porosity sufficient for filtering a second particulate matter from fluid passing therethrough, a plurality of strands loosely woven to form an open weave cloth between said first and second sections of filter paper and permanently sandwiched therewith, the reticulations of said cloth forming voids interposed between the strands thereof and between said first and second sections of filter paper, and a third stage portion including a chemical conditioning agent retained in said voids by the woven strands of said cloth for conditioning fluid passing therethrough.

7. A composite fluid treating element comprising means forming first and second layers for filtering fluid, means interposed between said first and second layers and permanently sandwiched therewith for spacing said layers and including means forming voids, and granular means in loose granular form in said voids retained by said last-named means for conditioning fluid, said voids being of a size relatively larger than said granular means.

References Cited by the Examiner
UNITED STATES PATENTS

| | | | |
|---|---|---|---|
| 1,197,403 | 9/1916 | Seavey | 210—502 |
| 2,101,811 | 12/1937 | Franzmeier | 210—490 |
| 2,395,449 | 2/1946 | Briggs | 210—502 X |
| 3,198,334 | 8/1965 | Brucken et al. | 210—489 X |

FOREIGN PATENTS

| | | |
|---|---|---|
| 19,172 | 1911 | Great Britain. |

REUBEN FRIEDMAN, *Primary Examiner.*

D. M. RIESS, *Assistant Examiner.*